US011066872B2

United States Patent
Nagel et al.

(10) Patent No.: US 11,066,872 B2
(45) Date of Patent: *Jul. 20, 2021

(54) SECURITY FOCUSED SYSTEM FOR SMART WINDOWS

(71) Applicant: Kinestral Technologies, Inc., Hayward, CA (US)

(72) Inventors: Paul Nagel, Hayward, CA (US); Wally Barnum, Hayward, CA (US); Stephen Coffin, Hayward, CA (US); Brandon Nichols, Hayward, CA (US); Antoine Dubois, Hayward, CA (US)

(73) Assignee: KINESTRAL TECHNOLOGIES, INC., Hayward, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/820,380

(22) Filed: Mar. 16, 2020

(65) Prior Publication Data

US 2020/0217127 A1 Jul. 9, 2020

Related U.S. Application Data

(63) Continuation of application No. 16/404,394, filed on May 6, 2019, now Pat. No. 10,590,698, which is a continuation of application No. 15/620,686, filed on Jun. 12, 2017, now Pat. No. 10,280,682, which is a continuation of application No. 14/994,093, filed on Jan. 12, 2016, now Pat. No. 9,677,327.

(60) Provisional application No. 62/202,516, filed on Aug. 7, 2015, provisional application No. 62/102,516, filed on Jan. 12, 2015, provisional application No.
(Continued)

(51) Int. Cl.
E06B 9/24 (2006.01)
G02F 1/163 (2006.01)
E06B 9/68 (2006.01)
E06B 9/32 (2006.01)
G08B 25/08 (2006.01)

(52) U.S. Cl.
CPC .................. *E06B 9/24* (2013.01); *E06B 9/68* (2013.01); *G02F 1/163* (2013.01); *E06B 9/32* (2013.01); *E06B 2009/2405* (2013.01); *E06B 2009/2464* (2013.01); *E06B 2009/6818* (2013.01); *G08B 25/08* (2013.01)

(58) Field of Classification Search
CPC ...................................................... G02F 1/153
See application file for complete search history.

(56) References Cited

U.S. PATENT DOCUMENTS 9,677,327 B1 * 6/2017 Nagel ........................ E06B 9/68
10,280,682 B1 * 5/2019 Nagel ........................ E06B 9/24
(Continued)

*Primary Examiner* — Nabil H Syed
*Assistant Examiner* — Cal J Eustaquio
(74) *Attorney, Agent, or Firm* — Womble Bond Dickinson (US) LLP

(57) ABSTRACT

A smart window-based security system is provided. The system includes a plurality of smart windows, each smart window of the plurality of smart windows having at least one electrochromic window and at least one sensor integrated into the smart window. The plurality of smart windows are coupled together in a system having at least one processor configured to detect a personal or property security threat, such as an intruder or fire based, on information from sensors of the plurality of smart windows.

20 Claims, 11 Drawing Sheets

Related U.S. Application Data

62/102,508, filed on Jan. 12, 2015, provisional application No. 62/102,515, filed on Jan. 12, 2015.

(56) References Cited

U.S. PATENT DOCUMENTS

| | | | |
|---|---|---|---|
| 10,590,698 B2* | 3/2020 | Nagel | E06B 9/24 |
| 2012/0188627 A1* | 7/2012 | Chen | H04Q 9/00 |
| | | | 359/275 |

* cited by examiner

Transmissivity Cycling

SECURITY FOCUSED SYSTEM FOR SMART WINDOWS

BACKGROUND

Electrochromic devices, in which optical transmissivity is electrically controlled, are in current usage in building windows and in dimmable automotive rearview mirrors. Generally, electrochromic windows for a building are controlled with a driver and a user input, e.g., a dimmer control. Electrochromic rearview mirrors in automotive usage often have a light sensor aimed to detect light from headlights of automobiles, and are user-settable to engage an auto-dim function that adjusts the tint of the mirror based on input from the light sensor. There is a need in the art for a control system for electrochromic devices which goes beyond such basic settings and functions.

SUMMARY

In some embodiments, a smart window-based security system is provided. The system includes a plurality of smart windows, each smart window of the plurality of smart windows having at least one electrochromic window and at least one sensor integrated into the smart window. The plurality of smart windows are coupled together in a system having at least one processor configured to detect a personal or property security threat based on information from sensors of the plurality of smart windows.

In some embodiments, a security system with smart windows is provided. The system includes a plurality of smart windows networked to form a system having at least one processor. The plurality of smart windows each integrates therein one or more sensors and at least one electrochromic window. The at least one processor is configured to control transmissivity of the at least one electrochromic window of each of the plurality of smart windows, based on information from the plurality of smart windows and the at least one processor is configured to sense a personal or property security threat, responsive to the information from the plurality of smart windows.

In some embodiments, a method of operating a security system having smart windows, performed by at least one processor, is provided. The method includes receiving sensor information from a plurality of smart windows each having at least one electrochromic window and at least one sensor, wherein the at least one electrochromic window is operated in accordance with the at least one sensor. The method includes detecting a security event, based on the sensor information.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A smart window system, disclosed herein, has a distributed device network control system architecture that can distribute control of optical transmissivity of smart windows across the smart windows, intelligent window controller/drivers, a command and communication device, and one or more resources on a network. A smart window within such a system can be defined as a window with some local and/or external or remote computer processing capabilities and which is connectable to the internet. In some embodiments the window is an electrochromic window but this is not meant to be limiting as non-electrochromic windows may be smart windows as described herein. Electrochromic and non-electrochromic windows may be integrated into the same system in some embodiments. The smart window may function as a glass partition in some embodiments and be within an interior of a structure rather than have one surface facing an exterior in some embodiments. The smart window system combines input from sensors integrated with the smart windows, user input, and information and direction from the network to control the smart windows in an interactive, adaptive manner. Control can shift from one component to another, be shared across multiple components, or be overridden by one component of the system, in various embodiments. The distributed nature of the architecture and the control support various system behaviors and capabilities. FIGS. 1-5 show various embodiments of a smart window system and the distributed device network control system architecture. FIGS. 6-13 illustrate a security focused system for smart windows, with system behaviors and capabilities inclusive of those described above but also featuring specialized behaviors and capabilities dedicated to detecting and reacting to security events. These embodiments have various mechanisms for detecting a personal or property security threat such as an intrusion or an intruder, a fire or smoke, carbon monoxide, chemical or other hazardous air quality, etc., and for controlling transmissivity of smart windows so as to prove advantageous to occupants or emergency personnel.

Figure 1:
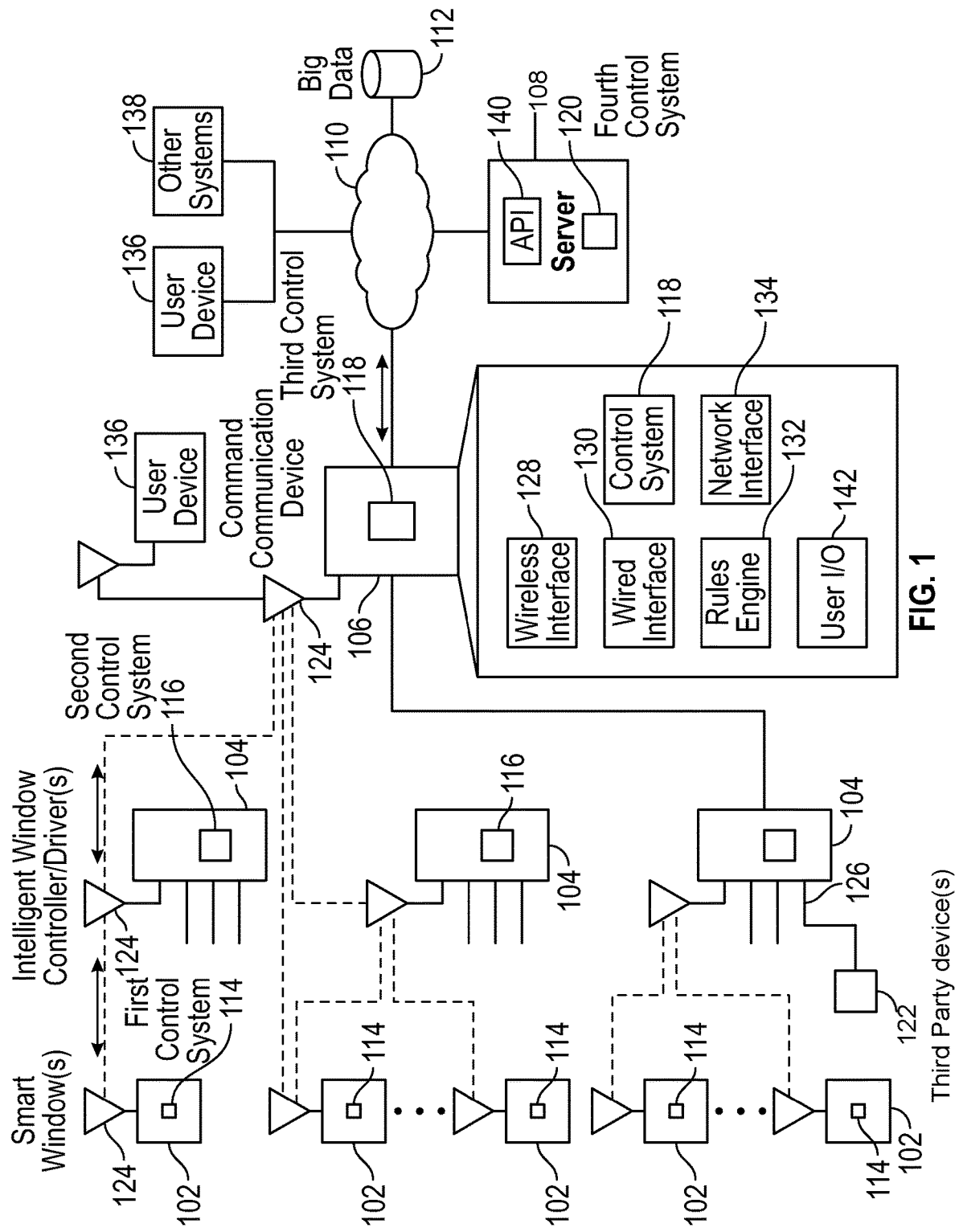
FIG. 1 is a system diagram of a smart window system that has a distributed device network control system architecture in accordance with some embodiments.

FIG. 1 is a system diagram of a smart window system that has a distributed device network control system architecture in accordance with an embodiment of the present disclosure. The system is both modular and distributed, and is suitable for installation in various living, working or commercial spaces, such as an apartment, house, an office, a building, a store, a mall, etc. Modularity allows for replacement of individual components, upgrades, expansion, linking of two or more systems, and communication in the system and among multiple systems. Wireless couplings, wired couplings, and combinations thereof are supported by the smart window system. Although antennas 124 are shown for the wireless coupling, further embodiments could use infrared coupling.

Control is distributed across one or more first control systems 114, with one in each smart window 102, one or more second control systems 116, with one in each intelligent window controller/driver 104, a third control system 118 in a command and communication device 106, and a fourth control system 120 in a server 108 coupled to a network 110. Each smart window 102 has an antenna 124 and is thereby wirelessly connected to a nearby intelligent window controller/driver 104, also with an antenna 124. In further embodiments, a wired connection could be used. Each intelligent window controller/driver 104 is wirelessly connected to the command and communication device 106, which has an antenna 124. In further embodiments, a wired connection could be used. The command and communication device 106 is coupled to a network 110, such as the global communication network known as the Internet. This coupling could be made via a wireless router (e.g., in a home, office, business or building), or a wired network connection. User devices 136 (e.g., smart phones, computers, various computing and/or communication devices) can couple to the command and communication device 106, for example by a direct wireless connection or via the network 110, or can couple to the server 108 via the network 110, as can other systems 138 and big data 112. In some embodiments, the server 108 hosts an application programming interface 140. The server 108 could be implemented in or include, e.g., one or more physical servers, or one or more virtual servers implemented with physical computing resources, or combinations thereof.

Modularity of the system supports numerous layouts and installations. For example, each windowed room in a building could have one or more smart windows 102 and a single intelligent window controller/driver 104 for that room. An intelligent window controller/driver 104 could control smart windows 102 in part of a room, an entire room, or multiple rooms. The intelligent window controller/driver(s) 104 for that floor of the building, or for a portion of or the entire building in some embodiments, could tie into a single command and communication device 106, which is coupled to the network 110 and thereby coupled to the server 108. In a small installation, one or more smart windows 102 could couple to a single intelligent window controller/driver 104 for local distributed control, or a single command and communication device 106 for both local and network distributed control. Or, an intelligent window controller/ driver 104 could be combined with the command and communication device 106, in a further embodiment for small systems that use both local control and network information. Large systems, e.g., for multiple occupant buildings, could have multiple command and communication devices 106, e.g., one for each occupant or set of occupants, or each floor or level in the building, etc. Upgrades or expansions are readily accommodated by the addition of further components according to the situation.

In one embodiment as shown in FIG. 1, the command and communication device 106 has a wireless interface 128, a wired interface 130, a control system 118, a rules engine 132, a network interface 134, and a user I/O (input/output) module 142. The wireless interface 128 and/or the wired interface 130 are used for coupling to the intelligent window controller/driver(s) 104. The network interface 134 is used for connecting to the network 110. For example, the network interface 134 could connect to a wireless router or Wi-Fi, e.g., via the wireless interface 128, or to a wired network via the wired interface 130. In some embodiments, the wireless interface 128 and/or the wired interface 130 can couple to third-party devices for sensing, input and/or output (see, e.g., description regarding FIG. 3). The rules engine 132 uses information from the network 110, which can include direction from the fourth control system 120 in the server 108, and can include information from user devices 136, other systems 138, or big data 112, to create, populate, modify, or adapt various rules for operation of the smart windows 102. The user I/O module 142 accepts user input, e.g., via buttons, a touchscreen, etc., and displays user output, e.g., via a display screen or with LEDs or other lamps, etc. Some embodiments may lack the user I/O module 142, or have a user input module or an output module. In keeping with the nature of this distributed control system, the third control system 118 of the command and communication device 106 can direct operation of the smart windows 102, the second control system 116 of the intelligent window controller/driver(s) 104 can direct operation of the smart windows 102, the fourth control system 120 of the server 108 can direct operation of the smart windows 102, and/or the first control system 114 of each smart window 102 can direct operation of that smart window 102, in various combinations. Some embodiments have a failover mechanism, in which control and/or communication are routed around a failed device in the system.

As shown by the dashed lines, communication can proceed amongst various members of the smart window system over various paths, in various embodiments. In some embodiments, a message or other communication is passed along a chain, such as from a smart window 102, to an intelligent window controller/driver 104, or via the intelligent window controller/driver 104 to the command and communication device 106, and vice versa. In some embodiments, a device can be bypassed, either by direct communication between two devices or by a device acting as a relay. For example, a smart window 102 could communicate directly with a command and communication device 124 wirelessly via the wireless interface 128 or via the wired interface 130. Or, an intelligent window controller/driver 104 could relay a message or other communication, as could the command and communication device 106. In some embodiments, messages or communications can be addressed to any component or device in the system, or broadcast to multiple devices, etc. This could be accomplished using packets for communication, and in some embodiments any of the control systems 114, 116, 118, 120 can communicate with the cloud, e.g., the network 110.

Figure 2:
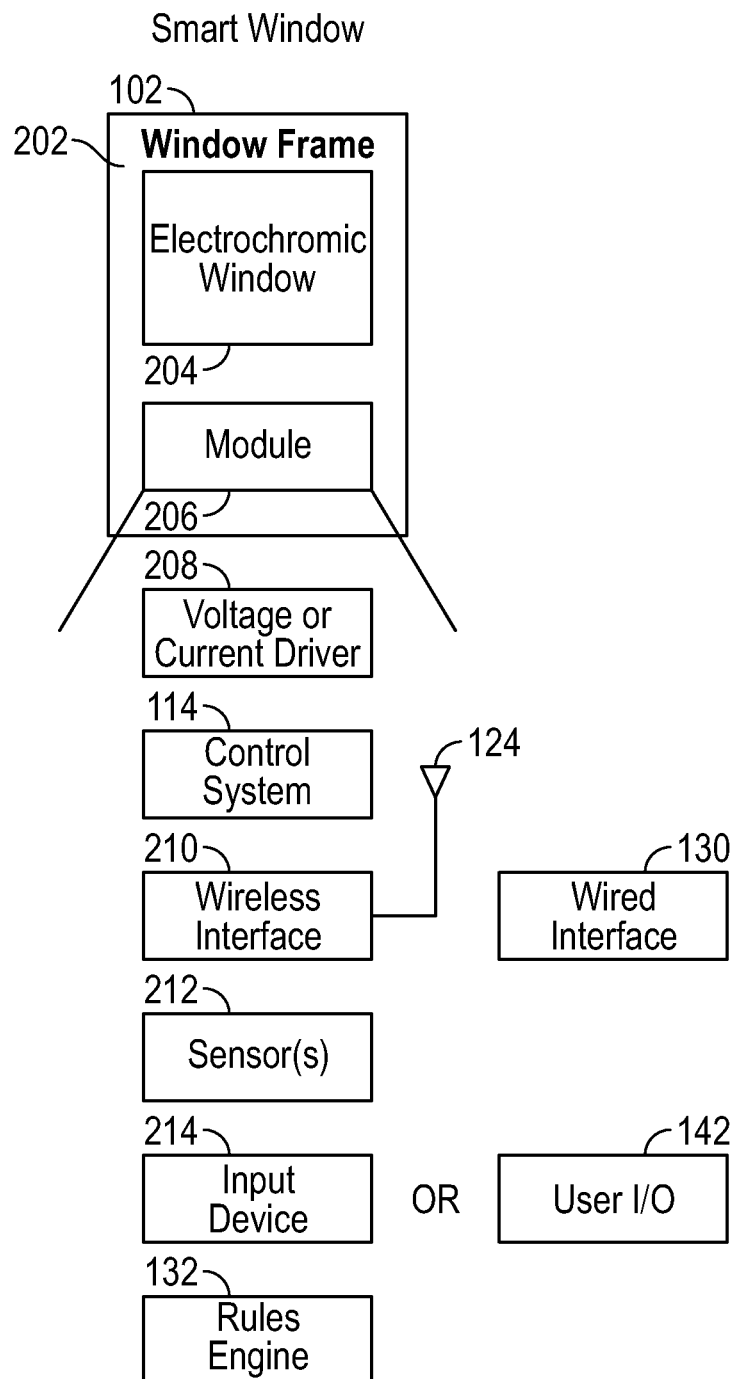
FIG. 2 is a system diagram of a smart window that has an electrochromic window and a window frame with an embedded module in accordance with some embodiments.

FIG. 2 is a system diagram of a smart window 102 that has an electrochromic window 204 and a window frame 202 with an embedded module 206. The embedded module 206 could be positioned at the bottom, top, to one or both sides, or distributed around the window frame 202 in various embodiments. The embedded module 202 has one or more sensors 212, which could include temperature, light, audio/acoustic (i.e., sound), vibration, video or still image, motion, smoke detection, chemical, humidity or other sensors, and which could be facing inwards, i.e., into a room, or outwards, i.e., to the exterior of the room or building, in various embodiments. The wireless interface 128 has an antenna 124, which is used for coupling to the intelligent window controller/driver(s) 104, the command and communication device 106, and/or one or more user devices 136 (e.g., a smart phone, a user wearable device, etc.). A wired interface 130 could also be included, or could be used in place of a wireless interface 128. The control system 114, shown as the first control system 114 in FIG. 1, provides local control for the electrochromic window 204 via the voltage or current driver 208. Alternatively, the control system 114 participates in distributed control. Some embodiments have a rules engine 132 in the module 206. The voltage or current driver 208 sends voltage or current to bus bars of the electrochromic window 204, as directed by one or more of the control systems 114, 116, 118, 120, to control transmissivity of the electrochromic window 204. In some embodiments, to change transmissivity of the electrochromic window 204, the voltage or current driver 208 provides constant current until a sense voltage of the electrochromic window 204 is reached. Then, the voltage or current driver 208 provides a current that maintains the sense voltage at a constant voltage, until a total amount of charge is transferred to the electrochromic window 204 for the new transmissivity level. The embedded module 206 also includes an input device 214, or a user I/O module 142, through which user input can be entered at the smart window 102. In some embodiments, user input can also be entered through the wireless interface 128, e.g., from a smart phone.

Figure 3:
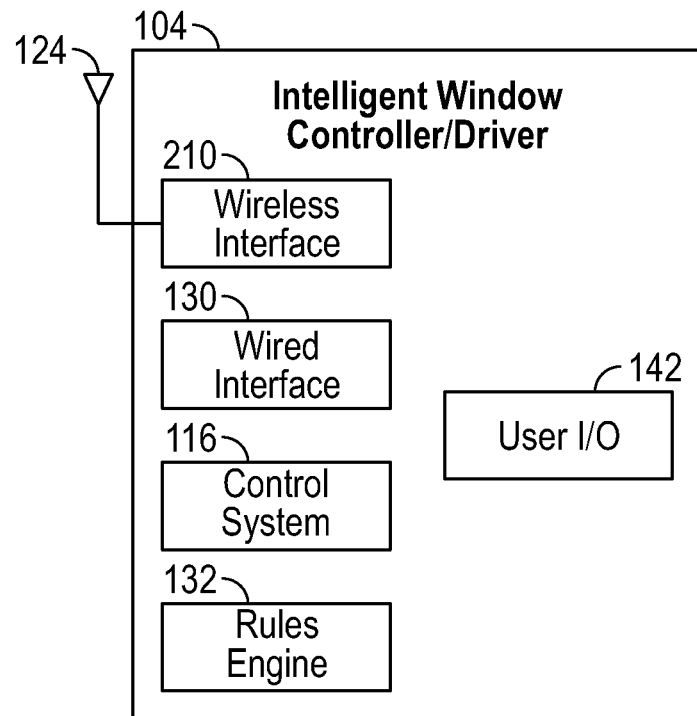
FIG. 3 is a system diagram of an intelligent window controller/driver, from the smart window system of FIG. 1 in accordance with some embodiments.

FIG. 3 is a system diagram of an intelligent window controller/driver 104, from the smart window system of FIG. 1. The intelligent window controller/driver 104 includes a wireless interface 128 with an antenna 124, a wired interface 130, a user I/O module 142, and a control system 116, which is shown as the second control system 116 in FIG. 1. Some embodiments have a rules engine 132. The wireless interface 128 couples to one or more smart windows 102 via the wireless interface 128, as shown in FIG. 1, although the wired interface 130 could be used in further embodiments. Either the wireless interface 128 or the wired interface 130 can be used to couple to the command and communication device 106, in various embodiments. In some embodiments, the wireless interface 128 and/or the wired interface 130 can couple to further devices, such as third-party devices for input information, sensing or control output. For example, the system could control or interact with lighting controllers, HVAC (heating, ventilation and air-conditioning, e.g., by coupling to a thermostat), burglar and/or fire alarm systems, sound system, desktop, smart phones, or other systems or devices, or receive further input from further sensors, cameras, etc. It should be appreciated that the wireless interface 128 and/or the wired interface 130 may accommodate voice commands through I/O module 142 or some other input device. In some embodiments, non-control output and information exchange can be completed with a third party device for analytical purposes. The user I/O module 142 could include buttons, a touchpad, a touchscreen, a display screen, etc., for user input to the system and/or output from the system. The second control system 116 participates in distributed control with the first control system 114 of the smart window 102, or can override the first control system 114. In some embodiments, the second control system 116 relays direction from the third control system 118 of the command and communication device, or the fourth control system 120 of the server 108, to one or more smart windows 102. It should be appreciated that the location of the intelligent window controller/driver 104 may be integrated with the window or wall mounted proximate to a window or windows. In addition, the intelligent window controller/driver 104 may be utilized to control other home systems, such as lights, home entertainment systems, etc.

Figure 4:
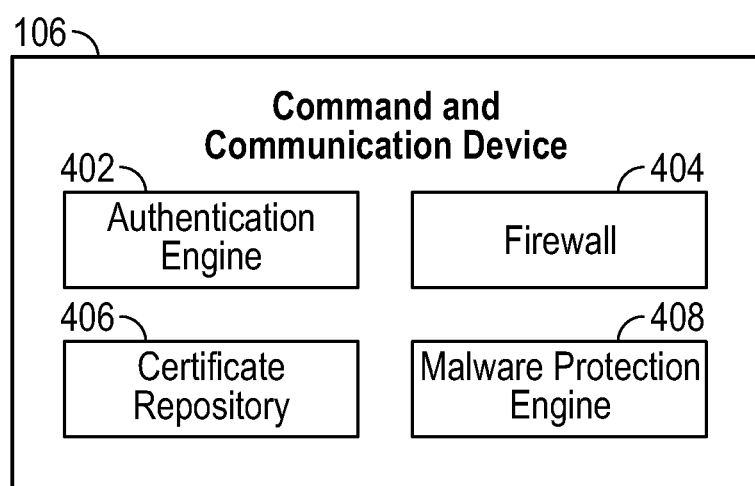
FIG. 4 is a system diagram of a command and communication device, from the smart window system of FIG. 1 in accordance with some embodiments.

FIG. 4 is a system diagram of a command and communication device 106, from the smart window system of FIG. 1. Since the command and communication device 106 is coupled to the network 110, in some embodiments the command and communication device 106 has various protections against unauthorized access. Here, the command and communication device 106 has a firewall 104, a malware protection engine 408, an authentication engine 402, and a certificate repository 406. The firewall 104 is applied in a conventional manner, to communications arriving via the wired interface 130 or the wireless interface 128 (see FIG. 1).

The authentication engine 402 can be applied to authenticate any component that is coupled to or desires to couple to the command and communication device 106. For example, each smart window 102 could be authenticated, each intelligent window controller/driver 104 could be authenticated, and the server 108 could be authenticated, as could any user device 136 or other system 138 attempting to access the smart window system. The command and communication device 106 can authenticate itself, for example to the server 108. To do so, the command and communication device 106 uses a certificate from the certificate repository 406 for an authentication process (e.g., a "handshake") applied by the authentication engine 402.

The malware protection engine 408 can look for malware in any of the communications received by the commanded communication device 106, and block, delete, isolate or otherwise handle suspected malware in a manner similar to how this is done on personal computers, smart phones and the like. Updates, e.g., malware signatures, improved malware detection algorithms, etc., are transferred to the malware protection engine 408 via the network 110, e.g., from the server 108 or one of the other systems 138 such as a malware protection service.

Figure 5:
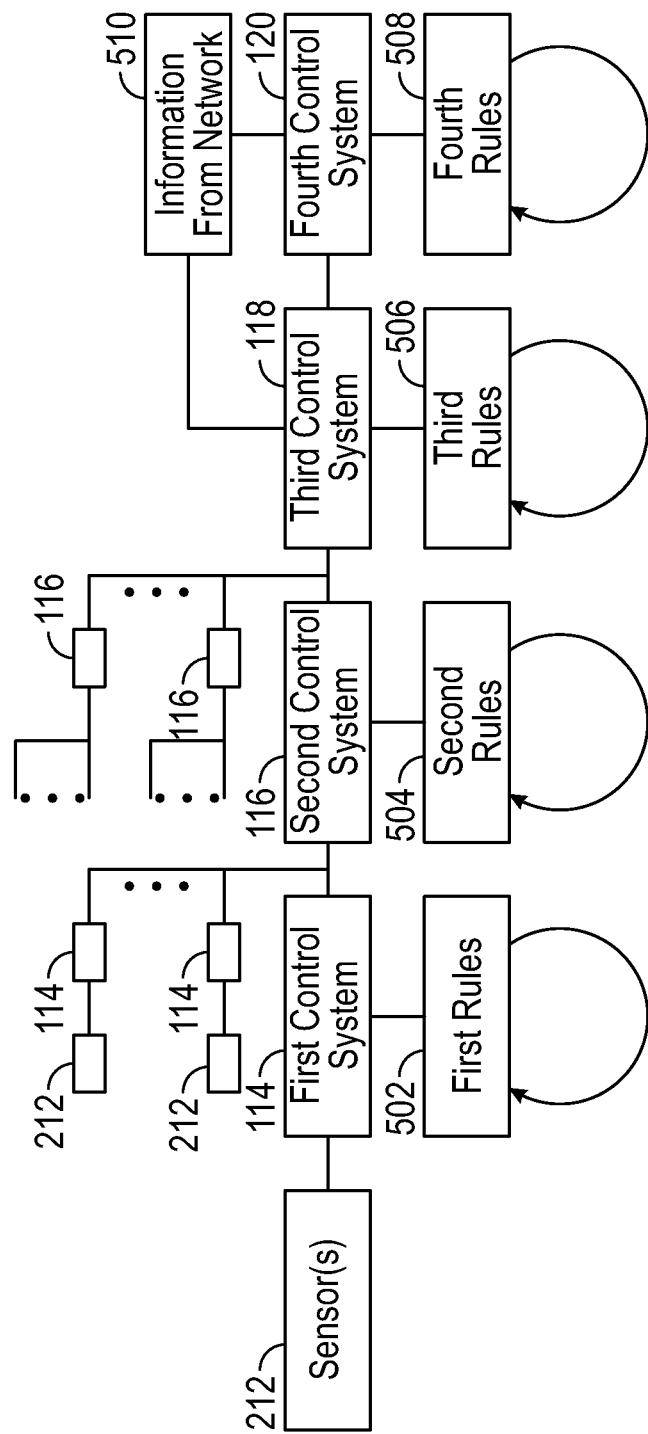
FIG. 5 is a block diagram showing aspects of the distributed device network control system architecture of FIG. 1 in accordance with some embodiments.

FIG. 5 is a block diagram showing aspects of the distributed device network control system architecture of FIG. 1. Although this architecture lends itself to hierarchical control, which can be performed by overrides or blocking from components higher up in the chain, or by weighting inputs, votes, or commands, it should be appreciated that control is generally distributed across and movable among the first control system(s) 114, the second control system(s) 116, the third control system 118 and the fourth control system 120, i.e., distributed across and movable among the server 108, the command and communication device 106, the intelligent window controller/drivers 104, and the smart windows 102. Smart windows 102 can be operated individually, or in various groups (e.g., facing in a particular direction, installed at a common location (height or wall area) or associated with a particular room or group of rooms, or level or floor of a house or other building, subsets or groupings of windows, and so on) using this distributed control architecture. Generally, each control system 114, 116, 118, 120 controls or directs one or more of the smart windows 102, in cooperation with other members of the system. Each control system 114, 116, 118, 120 has respective rules, e.g., the first control system 114 has first rules 502, the second control system has second rules 504, the third control system 118 has third rules 506, the fourth control system 120 has fourth rules 508. Each control system 114, 116, 118, 120 operates according to its local rules, which may incorporate rules distributed from other devices, unless overridden by another device in the system. Rules can include cooperation with other devices, and rules can include instructions allowing for when an override is permissible. For example, an intelligent window controller/driver 104 could override a smart window 102, the command and communication device 106 could override an intelligent window controller/driver 104 or a smart window 102, the server 108 could override the command and communication device 106, an intelligent window controller/driver 104, or a smart window 102, or user input at one of the devices or from a user device 136 or software or application resident on the device could override one or more of these. Information from the sensors 212 of the smart window(s) 102 enters the system through the first control system(s) 114, and can be routed or directed to any of the further control systems 116, 118, 120. Information 510 from the network enters the system through the fourth control system 120, i.e., the server 108, and/or the third control system 118, i.e., the command and communication device 106, and can be routed or directed to any of the further control systems 114, 116. User input can enter the system through the smart windows 102, e.g., through user input at that smart window 102 or wireless user input from a user device 136 to the smart window 102. User input can also enter the system through the intelligent window controller/driver(s) 104, e.g., through user input at the intelligent window controller/driver 104 or wireless user input from a user device 136. User input can enter the system through the third control system 118, e.g., through a wireless coupling from a user device 136 or via the network connection, e.g., from a user device 136. User input can enter the system through the fourth control system 120, e.g., via the server 108. From any of these entry points, the user input can be routed to any of the control systems 114, 116, 118, 120. Each of the control systems 114, 116, 118, 120 can communicate with each other control system 114, 116, 118, 120, and can update respective rules 502, 504, 506, 508 as self-directed or directed by another one or combination of the control systems 114, 116, 118, 120. Control can be cooperative, voted, directed, co-opted, overridden, local, distributed, hierarchical, advisory, absolute, and so on, in various combinations at various times during operation of the system, in various embodiments. It should be appreciated that user inputs can include pre-programmed rules, agent-programmed rules, user programmed rules, and artificial intelligence that acts based on rules or makes statistical or analytical based decisions.

In some embodiments, the smart window system operates the smart windows 102 in a continuous manner, even if there is a network 110 outage (e.g., there is a network outage outside of the building, a server is down, or a wireless router for the building is turned off or fails, etc.). The first control system 114, the second control system 116 and/or the third control system 118 can direct the smart windows 102 without information from the network, under such circumstances. In various combinations, each of the control systems 114, 116, 118, 120 can create, store, share and/or distribute time-bound instructions (e.g., instructions with goals to perform a particular action at or by a particular time), and these time-bound instructions provide continuity of operation even when one or more devices, or a network, has a failure. When the network 110 is available, the third control system 118 obtains weather information from the network, either directly at the third control system 118 or with assistance from the server 108. For example, the third control system 118 could include and apply cloud-based adaptive algorithms. With these, the third control system 118 can then direct operation of the smart windows 102 based on the weather information. One or a combination of the control systems 114, 116, 118, 120 can direct operation of the smart windows 102 based on sensor information, such as from light, image, sound or temperature sensors of the smart windows 102. For example, if the weather information indicates cloud cover, or sensors 212 are picking up lowered light levels, the system could direct an increase in transmissivity of the smart windows 102, to let more natural light in to the building. If the weather information indicates bright sun, or sensors 212 are picking up increased or high light levels, the system could direct a decrease in transmissivity of the smart windows 102, to decrease the amount of natural light let in to the building. The system can modify such direction according to orientation of each window, so that windows pointing away from the incidence of sunlight are directed differently than windows pointing towards incidence of sunlight. If weather information indicates sunlight, and temperature sensors indicate low temperatures, the system could direct increased transmissivity of the smart windows 102, in order to let in more natural light and increase heating of a building interior naturally. Or, if the temperatures sensors indicate high temperatures, the system could direct decreased transmissivity of the smart windows 102, to block natural light and thereby hold down the heating of the interior of the building by sunlight.

Figure 6:
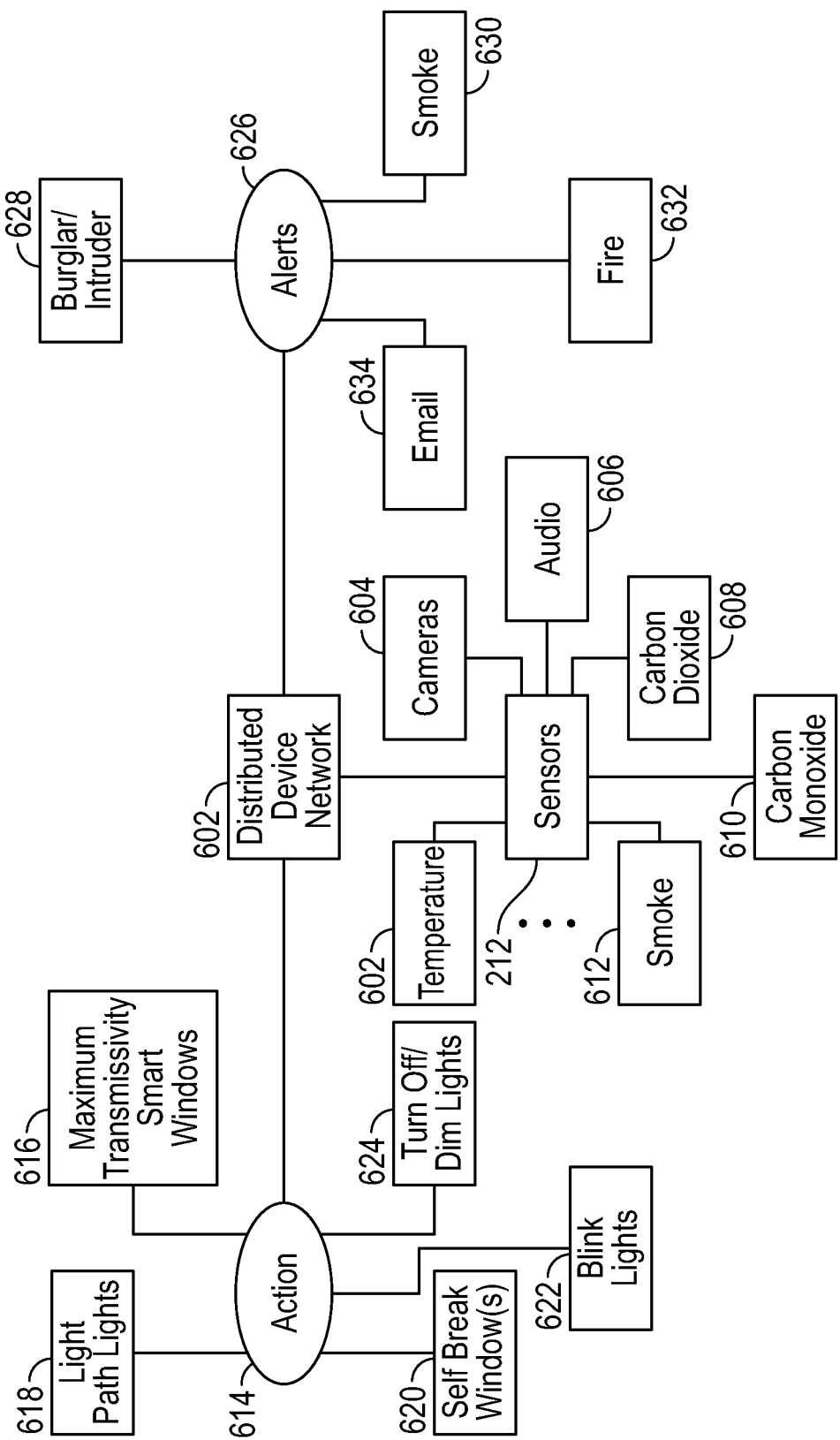
FIG. 6 is a system action diagram showing actions of a security focused system for smart windows, in an embodiment of the smart window system of FIG. 1 in accordance with some embodiments.

FIG. 6 is a system action diagram showing actions 614 of a security focused system for smart windows 102, in an embodiment of the smart window system of FIG. 1. Emphasis in embodiments of the security focused system is on detecting security events, such as a break-in, an intruder, a fire, etc. One or more sensors 212 in the distributed device network 602 (see depictions in FIGS. 1 and 5, and variations thereof) provide sensor data which the system can use to detect a security event, and then take action 614 and/or send alerts 626. In some embodiments, the action 614 may be triggered by a third party device, user or cloud signal. Distributed sensors 212 are embedded in the smart window system, specifically as embedded in smart windows 102 (see FIG. 2) and/or coupled to intelligent window controller/drivers 104 (see FIG. 1) in the distributed device network 602. The sensors 212 thus form one or more smart window perimeters and a window sensor network, which becomes the distributed intelligence of a building security system.

Sensors 212 in the system could include temperature sensors 602, cameras 604, audio sensors 606, carbon dioxide sensors 608, carbon monoxide sensors 610, smoke sensors 612, chemical or hazardous air quality sensors and so on, in various forms and combinations. Embodiments of sensors embedded in smart windows 102 are further described with reference to FIGS. 7 and 8, and scenarios in which the sensors 212 are used to detect security events are further described with reference to FIGS. 9 and 10.

Actions 614 that the security focused system could perform, in various combinations, in response to a security event include an action 616 to set maximum transmissivity for smart windows (or increased transmissivity, as a variation), an action 618 to light path lights, an action 620 to self-break one or more windows, an action 622 to blink lights, or an action 624 to turn off or dim lights. The above actions are described with reference to FIGS. 11A-12. Further actions, 614 such as opening/closing and lock/unlock windows are readily devised in keeping with the teachings herein.

Alerts 626 that the security focused system could send, in various combinations, in response to a security event include a burglar or intruder alert 628, a smoke alert 630, a fire alert 632, or an email 634. The system could send a text message to a user device 136, an audio message, a fax message, a video message (e.g., live streaming from one or more cameras 604, or recorded video), etc. In some embodiments, a user device 136 receiving an alert 626 could then select a camera 604 or an audio sensor 606 and receive a live or recorded stream from that device, or a mosaic of images or other presentation of still images, video or audio, on the user device 136 for monitoring. The user would then have the option of contacting authorities or a neighbor, etc. In some embodiments, such a live or recorded stream or other presentation could be directed to or archived in the server 108 (see FIG. 1), which could aid in criminal prosecution or insurance recovery, etc.

Figure 7:
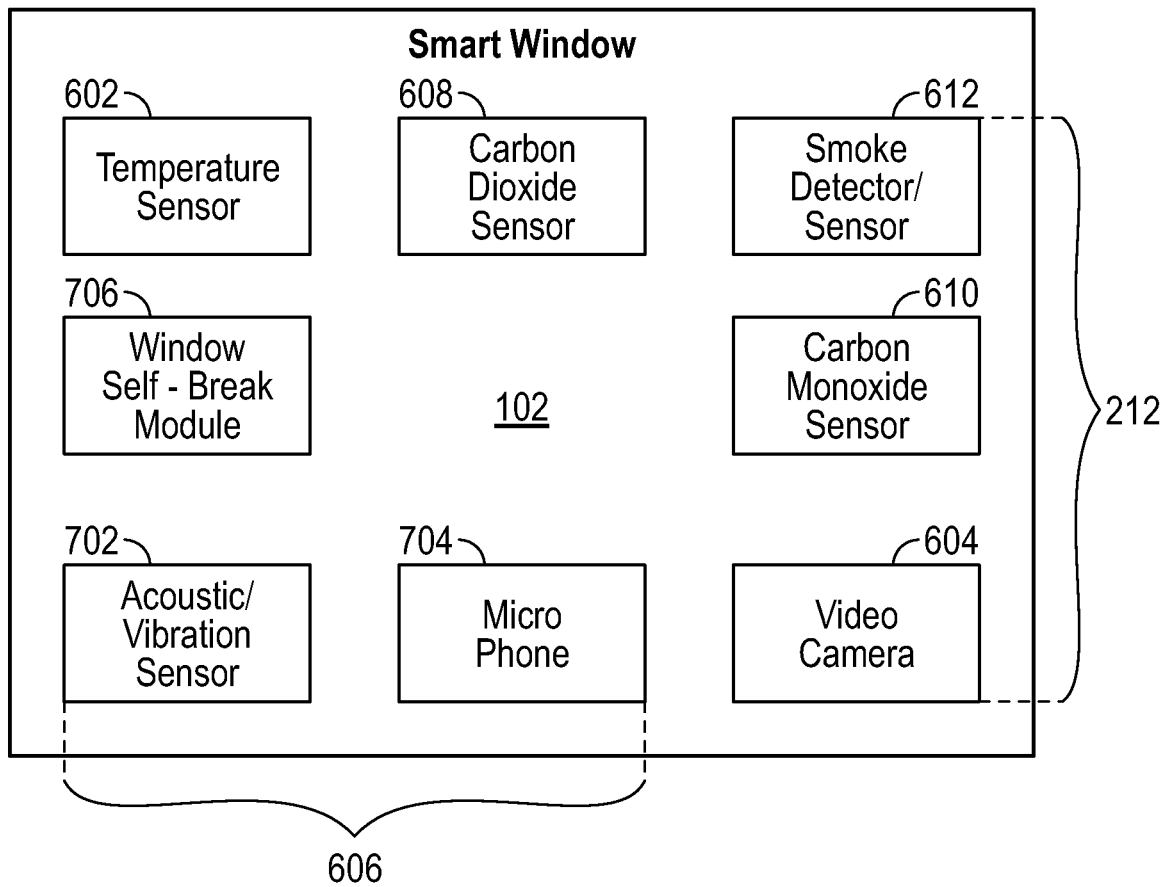
FIG. 7 is a system diagram of an embodiment of a smart window with various sensors suitable for the security focused system of FIG. 6 in accordance with some embodiments.

FIG. 7 is a system diagram of an embodiment of a smart window 102 with various sensors 212 suitable for the security focused system of FIG. 6. In various embodiments, each smart window 102 could have one or more of these or other sensors 212. In some embodiments, some smart windows 102 have some sensors 212, other smart windows 102 have differing sensors 212, and all smart windows 102 do not necessarily have the same sensors 212. Some embodiments have one or more sensors 212 embedded in a frame of the smart window 102. A thermocouple or other temperature sensing device could be employed as a temperature sensor 602. A video camera, a still camera or other image capturing device could be used as a camera 604, which could have various lenses and/or mirrors. There could be more than one camera 604. An acoustic or vibration sensor 702 could be used as an audio sensor 606. For example, a piezoelectric device in the vicinity of or contacting the electrochromic window 204 can serve to detect vibration of the electrochromic window 204, and may act as a microphone with the electrochromic window 204 as a diaphragm in some embodiments. Or, a vibration transducer, with a separate diaphragm, or with the electrochromic window 204 as a diaphragm, could be used. A microphone 704 could be used as an audio sensor 606. Various gas/chemical detection sensors, such as the carbon monoxide sensor 610 and the carbon dioxide sensor 608 can be used for detecting elevated levels of selected gases as associated with a fire. There are various types of smoke detectors and sensors 612, e.g., optical detectors, particulate detectors, and one or more of these could be used as a sensor 212.

Some embodiments of the smart window 102 have a window self-break module 706. This is used to break the electrochromic window 204, as a response to a security event. For example, a mechanism similar to an automotive airbag deployment module, with an electrically triggered chemical reaction, could be used, as could a small explosive charge. Alternatively, an electrically heated resistive element could crack the electrochromic window 204. In embodiments with double pane glass or plastic or the electrochromic window 204, such a chemical reaction device or small explosive charge could be placed in the sealed interior of the electrochromic window 204, between the two panes, and energized to "blow the hatch". This could allow a person to escape a fire, by climbing out a window. Or, it could distract an intruder, in a home invasion event. In case of a fire it may be beneficial to actively close all windows mechanically and unlock the windows. The breaking of the window may be triggered by a knock on the window when a fire is detected in some embodiments.

Figure 8:
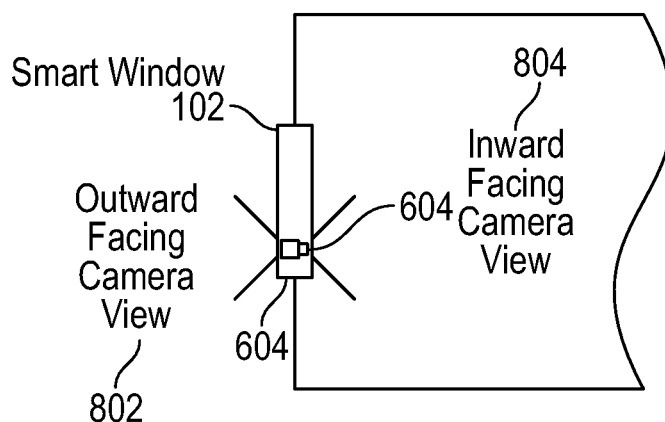
FIG. 8 is a diagram of a variation of the smart window of FIG. 7 in accordance with some embodiments.

FIG. 8 is a diagram of a variation of the smart window 102 of FIG. 7. Here, the camera 604 embedded in the smart window 102 has an outward facing camera view 802 (e.g., facing to the exterior of the room or building) and/or an inward facing camera view 804 (e.g., facing to the interior of the room or building). This can be accomplished with one camera appropriately mounted, two cameras, one facing inward, one facing outward, one camera with mirrors and a split view, wide or ultra-wide-angle lenses, compound lenses, etc. The outward facing camera view 802 could be useful in detecting a possible intruder approaching a smart window 102, for example with the intent of observing a potential target or breaking in. The inward facing camera view 804 could be useful in detecting an intruder or occupant in the interior of a room or building. In related matters, other sensors 212 could be mounted outward facing or inward facing.

Figure 9:
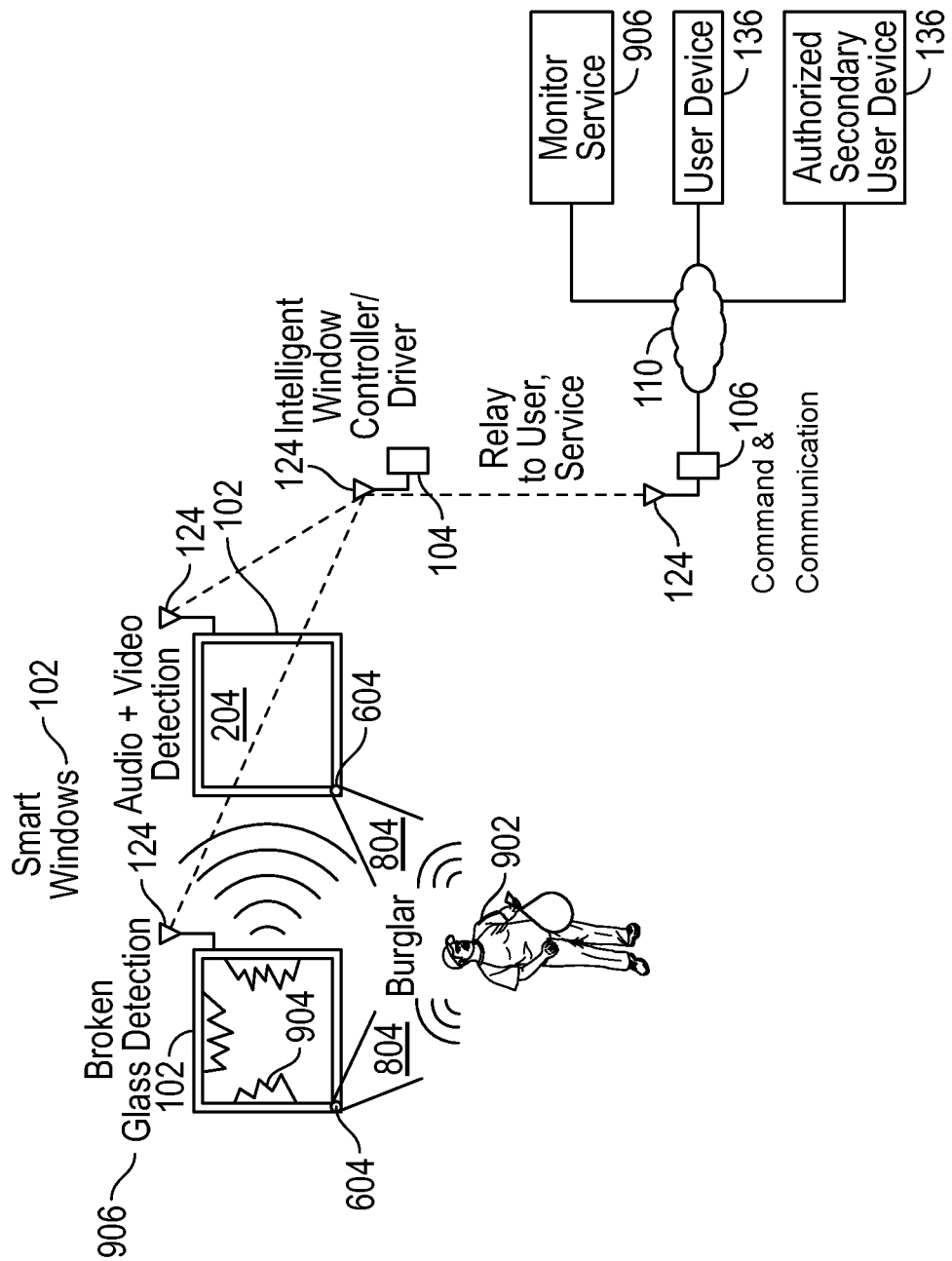
FIG. 9 is a scenario diagram showing the security focused system for smart windows detecting an intruder in accordance with some embodiments.

FIG. 9 is a scenario diagram showing the security focused system for smart windows 102 detecting an intruder 902. Various embodiments employ a single mechanism or multiple mechanisms to detect an intrusion or an intruder 902. One mechanism is broken glass detection 906, in which an acoustic/vibration sensor 702, or a microphone 704 or other audio sensor 606 detects the sound or vibration of glass breaking, as could occur if a burglar or other intruder 902 breaks a window to get in to a house or other building. Alternatively, the system could detect that operation of an electrochromic window 204 has suddenly changed, for example the electrochromic window 204 no longer sustains a constant or varied current during transmissivity changes, has a very different (e.g., out of a normal or expected) voltage reading across sense terminals or bus bars, or the electrochromic window 204 has a sudden change in measured resistance, etc.

One mechanism for intruder detection 902 is video detection. The outward facing camera view 802 could be used to detect a possible intruder 902 exterior to the room or building, and this could be compared with an inward facing camera view 804 to see if the possible intruder 902 has become an actual intruder 902 in the interior of the room or building. The system could be set to an "away" mode, in which detection of any moving, human-sized object in the interior of a room or building is indicative of an intruder 902. Audio sensors 606 could be similarly employed. The system can then relay sensor information from the smart windows 102 to the intelligent window controller/driver 104, and thence to the command and communication device 106. Since the system has distributed processing and intelligence, analysis of video information, audio information, or other sensor information can take place at one or more of the smart windows 102, the intelligent window controller/driver(s) 104 and/or the command and communication device 106, in various combinations and embodiments. For example, there could be distributed processing of such information, with each component performing part of the analysis, or components could relay raw information and the command and communication device 106 could perform the heavyweight analysis, etc. As an example suitable for the scenario depicted in FIG. 9, one smart window 102 could perform broken glass detection 906, another smart window 102 could perform video or audio verification of presence of an intruder 902, and the intelligent window controller/driver 104 and/or the command and communication device 106 could track movement of the intruder 902 and issue one or more alerts 626 or perform one or more actions 614. The command and communication device 106 could send alerts to a monitor service 906 (e.g., an alarm monitoring service that has authorization to dispatch fire, police or other emergency personnel), the user device 136, and/or an authorized secondary user device 136 (e.g., that of a neighbor, relative or other trusted person). Intruders 902 have various entry strategies, and various algorithms are readily developed to address these strategies and implemented in accordance with embodiments described herein.

Figure 10:
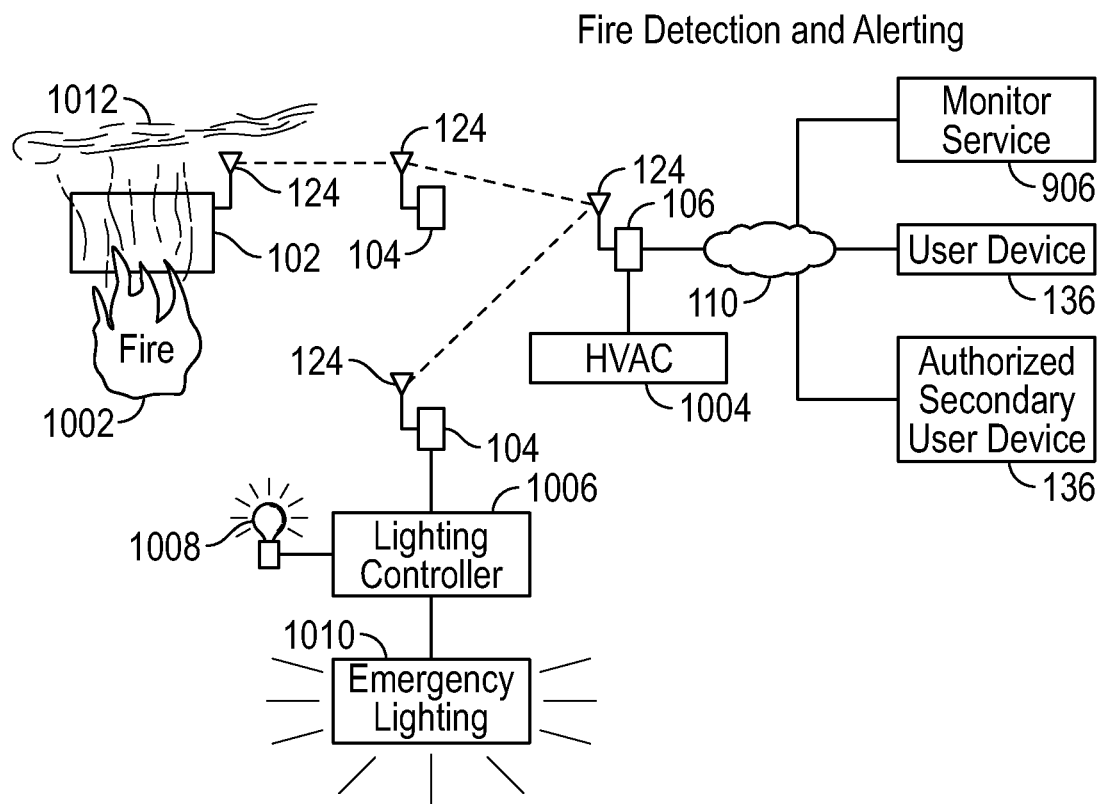
FIG. 10 is a scenario diagram showing the security focused system for smart windows detecting a fire in accordance with some embodiments.

FIG. 10 is a scenario diagram showing the security focused system for smart windows 102 detecting a fire 1002. One or more sensors 212 of one or more smart windows 102 detect a fire 1002 and/or smoke 1012. Sensor information is relayed from the smart window(s) 102 to the intelligent window controller/driver(s) 104 and the command and communication device 106. For example, fire could be detected by a temperature sensor 602, a camera 604, a light sensor, or an audio sensor 606 (e.g., listening for the crackle of a fire or falling timbers). Smoke could be detected by a smoke detector/sensor 612, elevated levels of carbon dioxide could be sensed by a carbon dioxide sensor 608, or elevated levels of carbon monoxide could be sensed by a carbon monoxide sensor 610. Processing of sensor information could be performed in various components or in a distributed manner as described above with reference to intruder detection in FIG. 9. The command and communication device 106 sends alerts 626 to a monitor service 906, a user device 136 and/or an authorized secondary user device 136.

In some embodiments, the command and communication device 106, or in further embodiments the intelligent window controller/driver(s) 104, couples to and communicates with a heating ventilation or air conditioning unit (HVAC) 1004 and/or a lighting controller 1006. For example, the command and communication device 106 is shown with a wired connection to the heating, ventilation or air conditioning unit 1004, although in further embodiments a wireless connection could be used. The intelligent window controller/driver 104 is shown with a wired connection to a lighting controller 1006, although in further embodiments a wireless connection could be used. Or, a lighting controller 1006 could be integrated into an intelligent window controller/driver 104 or the command and communication device 106. In case of a fire 1002, and in response to detecting this as a security event, the command and communication device 106 directs the heating, ventilation or air conditioning unit 1004 to turn off all fans in order to prevent smoke 1012 or fire 1002 from spreading. The command and communication device 106 could direct the intelligent window controller/driver 104, or the intelligent window controller/driver 140 could decide, to operate lighting in various ways when so coupled to a lighting controller 1006. The intelligent window controller/driver 104 could direct the lighting controller 1006 to turn on emergency lighting 1010, turn on other lights 1008, or flash some or all of the lights 1008, or operate lighting in various further ways.

Figure 11A:
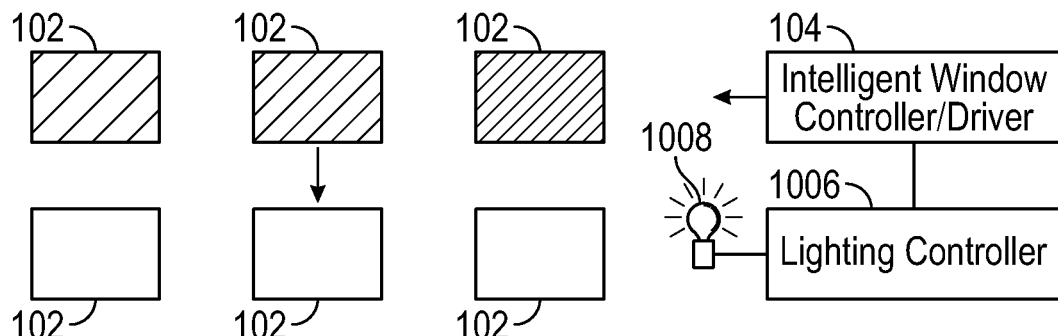
FIG. 11A depicts the security focused system for smart windows directing maximum optical transmissivity of the smart windows, and turning on the lights, as a response to a security event in accordance with some embodiments.

FIG. 11A depicts the security focused system for smart windows 102 directing maximum optical transmissivity of the smart windows 102, and turning on the lights 1008, as a response to a security event. The smart windows 102 are shown transitioning from various optical states of transmissivity to maximum transmissivity (or, increased transmissivity) at the direction of the intelligent window controller/driver 104. The intelligent window controller/driver 104 is also coupled to the lighting controller 1006, and directs the lighting controller 1006 to turn on the lights 1008, or flash the lights 1008, etc. This response to a security event could be useful to show responding personnel the condition of the interior of the house or other building in an emergency. For example, in case of a fire, the firefighters can see in through the increased or maximum transmissivity smart windows 102, to a well-lit interior, and perform rescue duties as appropriate. In case of an intruder 902, responding police personnel can see in through the increased or maximum transmissivity smart windows 102, to a well-lit interior, and see the intruder 902. In variations, if the system detects a fire or an intruder 902 in one room, or detects a fire anywhere in the house and presence of a person in one room, the system could direct the lighting controller 1006 to flash the lights 1008 in that room to draw attention to that situation. Further variations of this scenario and the response to the security event are readily devised and implemented in embodiments of the smart window system.

Figure 11B:
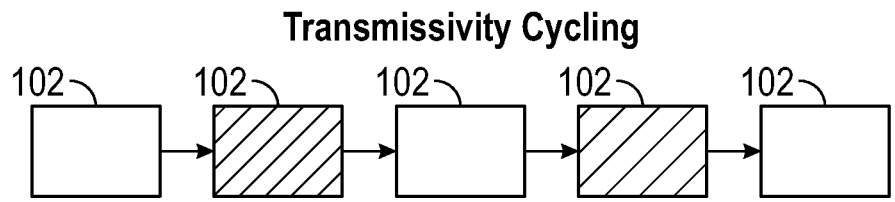
FIG. 11B depicts the security focused system for smart windows directing the smart windows to cycle transmissivity, as a response to a security event in accordance with some embodiments.

FIG. 11B depicts the security focused system for smart windows 102 directing the smart windows 102 to cycle transmissivity, as a response to a security event. A single smart window 102 is shown cycling from maximum transmissivity (at far left) to minimum transmissivity (at second to the left) and back to maximum transmissivity (in the middle), etc. In variations, reduced or increased transmissivity settings could be used. Transmissivity cycling could be used as an external indicator with or without flashing lights 1008 as described above with reference to FIG. 11A.

Figure 11C:
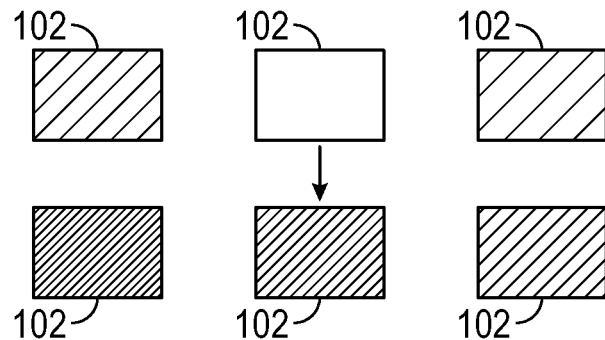
FIG. 11C depicts the security focused system for smart windows directing minimum optical transmissivity of the smart windows, as a nighttime or privacy tint function in accordance with some embodiments.

FIG. 11C depicts the security focused system for smart windows 102 directing minimum optical transmissivity of the smart windows 102, as a nighttime or privacy tint function. A group of smart windows 102 is shown transitioning from various states of transmissivity to minimum transmissivity. Alternatively, reduced transmissivity could be used. The nighttime or privacy tint function could be used in a scheme or profile, set to a specific time of day, or varied according to seasonal daylight variation, or activated in response to user input. The system would then override this setting in response to detecting a security event, as described above.

Figure 12:
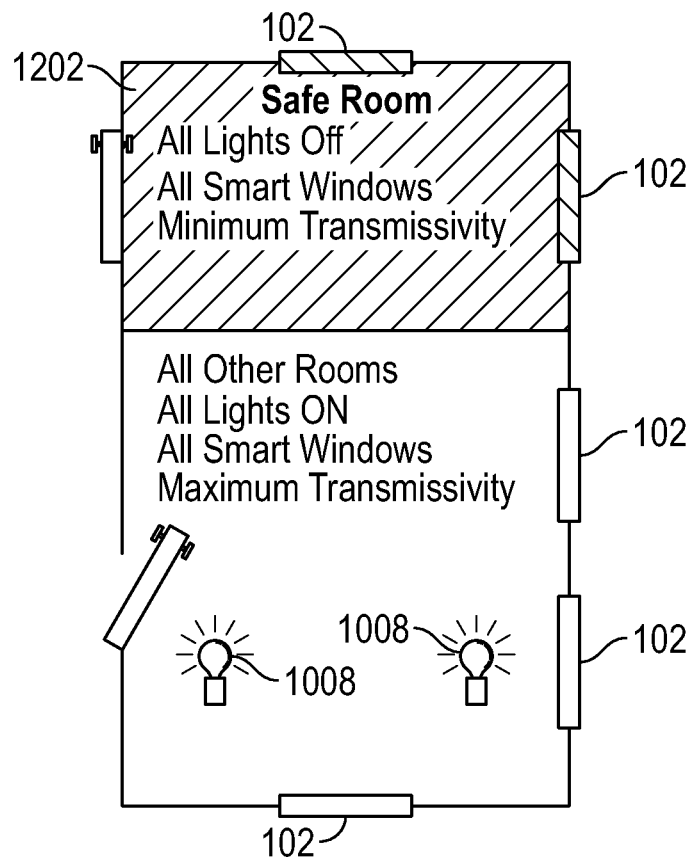
FIG. 12 depicts the security focused system for smart windows directing lights off and minimum transmissivity of all smart windows in a specified "safe room", and directing all other lights on and maximum transmissivity of all other smart windows elsewhere in the system, as a response to a security event in accordance with some embodiments.

FIG. 12 depicts the security focused system for smart windows 102 directing lights off and minimum transmissivity of all smart windows 102 in a specified "safe room" 1202, and directing all other lights on and maximum transmissivity of all other smart windows 102 elsewhere in the system, as a response to a security event. This is applicable to a hot prowl or home invasion scenario, in which the system detects an intruder 902 while other people may be present. The smart window system performs intruder detection as described above (see FIG. 9), and then in response directs a nighttime or privacy tint function (see FIG. 11 C) for the selected smart windows 102 as configured for the safe room 1202. The smart window system also directs a lighting controller 1006 (see FIG. 10) to turn off lights in the designated safe room 1202. Meanwhile, the smart window system directs maximum transmissivity (see FIG. 11A) of smart windows 102 other than the smart windows 102 of the designated safe room 1202, and directs either the same lighting controller 1006 or a further lighting controller 1006 to turn on lights 1008 other than any lights 1008 of the designated safe room 1202. This allows people to hide in a darkened safe room 1202, while the other rooms are highlighted internally and externally by lighting and maximum transmissivity smart windows 102 so that responding police or security personnel can more readily identify and apprehend an intruder 902. In a further embodiment, the system could activate a lock for the safe room 1202, or activate other security measures.

Figure 13:
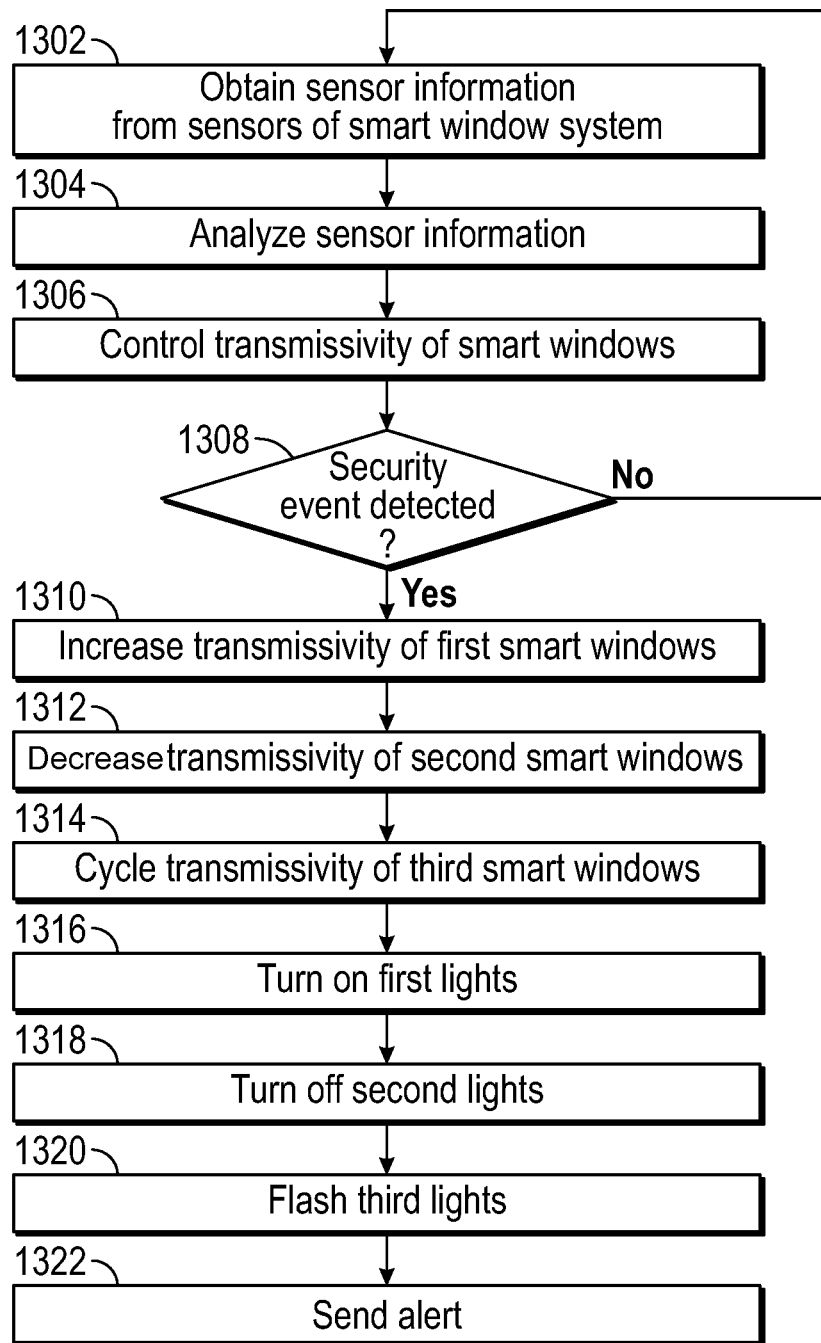
FIG. 13 is a flow diagram of a method of operating a smart window-based security system, which can be practiced on or using embodiments of the smart window system in accordance with some embodiments.

FIG. 13 is a flow diagram of a method of operating a smart window-based security system, which can be practiced on or using embodiments of the smart window system. The method can be practiced by one or more processors of the smart window system. Variations of the method, with fewer actions, more actions, differing sequences for actions, and/or actions dependent upon conditions such as whether the security event is a fire or an intruder detection, etc., are readily devised in keeping with the teachings herein.

In an action 1302, sensor information is obtained from sensors of a smart window system. Embodiments of the distributed device network, as described herein, have a distributed sensor network defining a security perimeter, and are suitable for gathering the sensor information. In an action 1304, the sensor information is analyzed. Analysis can take place in one or more components, or be distributed across multiple components of a smart window system. Transmissivity of smart windows is controlled, in an action 1306. The transmissivity settings, and operation of the system can be based on user input, the sensor information, and/or cloud-based learning. In a decision action 1308, it is determined whether a security event is detected. This determination is based on the analysis of the sensor information. If there is no security event detected, flow branches back to the action 1302, in order to obtain further sensor information, continue analysis of sensor information, and continue controlling transmissivity of the smart windows. If there is a security event detected, flow proceeds to the action 1310.

In the action 1310, transmissivity of first smart windows is increased. The transmissivity could be set to a maximum. This direction comes from the smart window system, and could be absolute or conditional depending upon what type of security event is detected. Selection of which smart windows are in which group of smart windows should be made, for example, during set up or installation, or at a later time but prior to the detection of a security event. In an action 1312, transmissivity of second smart windows is decreased. The transmissivity could be set to a minimum. This direction comes from the smart window system, and could be absolute or conditional depending upon what type of security event is detected. For example, selection of which smart windows are in the group of second windows could be in accordance with selection or designation of a safe room, and direction to decrease the transmissivity of these smart windows could be conditioned upon detection of an intruder or break-in. In an action 1314, transmissivity of third smart windows is cycled. This direction comes from the smart window system, and could be absolute or conditional depending upon what type of security event is detected. For example, smart windows in a room that has a fire, or has a person present, could be cycled to highlight this situation.

In an action 1316, first lights are turned on. In an action 1318, second lights are turned off. In an action 1320, third lights are flashed. This direction relies on the smart window system coupling to or integrating a lighting controller, and could be conditional depending on what type of security event is detected, or applied in various combinations to various groups of lights. In an action 1322, one or more alerts are sent. These could be sent via the network to which the smart window system is coupled, and could go out to a monitor service, or one or more of several user devices, etc. It should be appreciated that the alert may be sent at any point in the method upon determination of a security event being detected.

Figure 14:
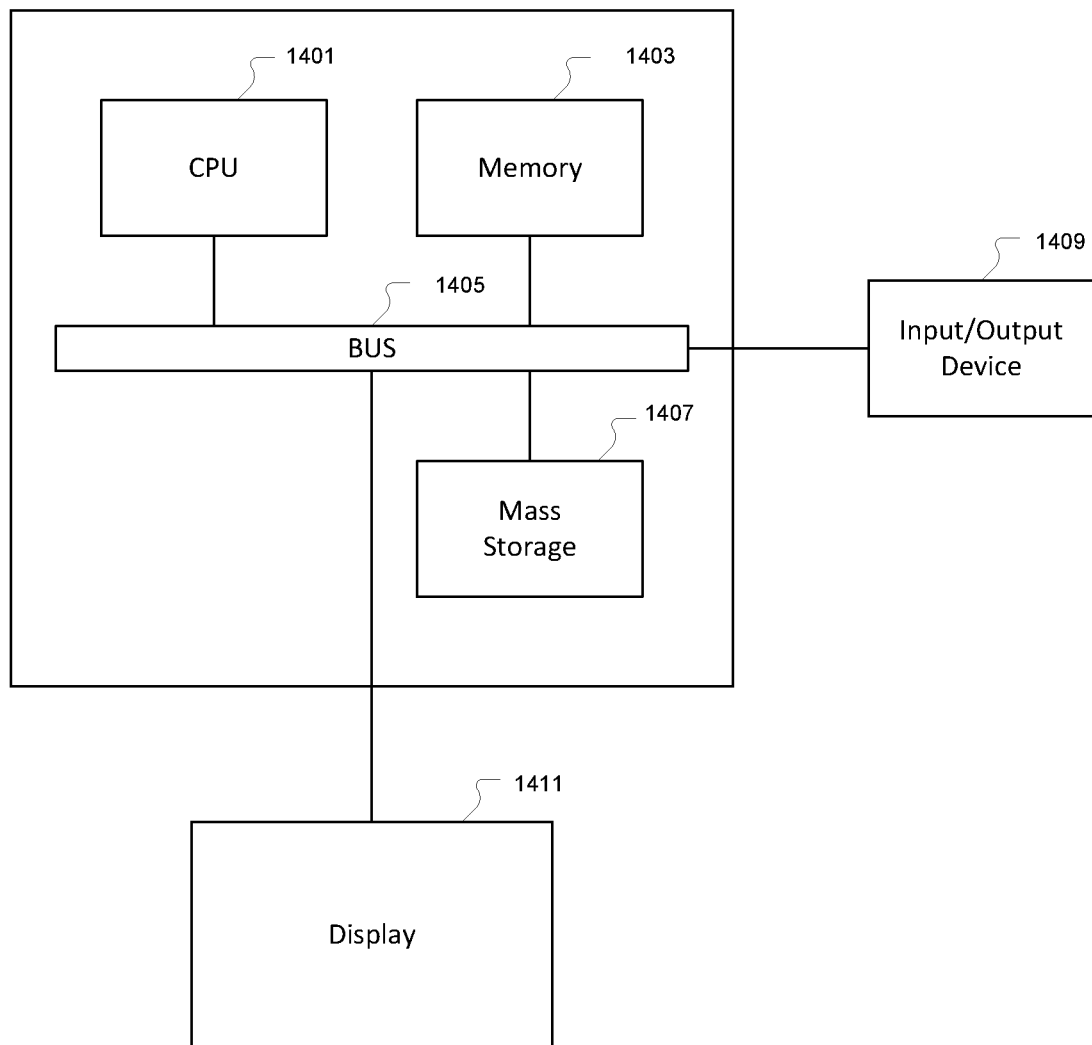
FIG. 14 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 14 is an illustration showing an exemplary computing device which may implement the embodiments described herein. The computing device of FIG. 14 may be used to perform embodiments of the functionality for the security focused system for smart windows in accordance with some embodiments. The computing device includes a central processing unit (CPU) 1401, which is coupled through a bus 1405 to a memory 1403, and mass storage device 1407. Mass storage device 1407 represents a persistent data storage device such as a floppy disc drive or a fixed disc drive, which may be local or remote in some embodiments. Memory 1403 may include read only memory, random access memory, etc. Applications resident on the computing device may be stored on or accessed via a computer readable medium such as memory 1403 or mass storage device 1407 in some embodiments. Applications may also be in the form of modulated electronic signals modulated accessed via a network modem or other network interface of the computing device. It should be appreciated that CPU 1401 may be embodied in a general-purpose processor, a special purpose processor, or a specially programmed logic device in some embodiments.

Display 1411 is in communication with CPU 1401, memory 1403, and mass storage device 1407, through bus 1405. Display 1411 is configured to display any visualization tools or reports associated with the system described herein. Input/output device 1409 is coupled to bus 1405 in order to communicate information in command selections to CPU 1401. It should be appreciated that data to and from external devices may be communicated through the input/output device 1409. CPU 1401 can be defined to execute the functionality described herein to enable the functionality described with reference to FIGS. 1-13. The code embodying this functionality may be stored within memory 1403 or mass storage device 1407 for execution by a processor such as CPU 1401 in some embodiments. The operating system on the computing device may be MS DOS™, MS-WINDOWS™, OS/2™, UNIX™, LINUX™, or other known operating systems. It should be appreciated that the embodiments described herein may also be integrated with a virtualized computing system that is implemented with physical computing resources.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A security system with smart windows, comprising:
    a plurality of smart windows in communication with each other to form a system having at least one processor;
    the plurality of smart windows each integrating therein one or more sensors into a frame of at least one electrochromic window; and
    the at least one processor configured to sense a security event, responsive to information from the plurality of smart windows, wherein the at least one processor is configured to increase and decrease transmissivity responsive to input received from the at least one sensor.

2. The system of claim 1 wherein the at least one electrochromic window includes a self-break module for breaking the at least one electrochromic window responsive to sensing the security event.

3. The system of claim 1, wherein the at least one sensor integrated into the smart window includes at least one of: a microphone, a camera, a glass breakage sensor, a temperature sensor, a smoke detection sensor, a carbon monoxide sensor, or a motion sensor.

4. The system of claim 1, wherein the system is in communication with a building monitoring system and wherein glass breakage is detected by interruption of electrical connectivity within the smart window.

5. The system of claim 1, further comprising:
    the system having the at least one processor, configured to couple to a lighting controller and configured to direct the lighting controller to flash lights or turn on lights, responsive to detecting the security event.

6. The system of claim 1, further comprising:
    the system having the at least one processor, configured to couple to an external network, and configured to send an alert via the network, responsive to detecting the security event.

7. The system of claim 1, wherein the at least one sensor integrated into the smart window includes a camera, and wherein the at least one processor is configured to control transmissivity of the plurality of smart windows based on at least one image the camera.

8. A security system with smart windows, comprising:
    a plurality of electrochromic windows networked together;
    at least one of the plurality of electrochromic windows integrating one or more sensors into a frame of the at least one electrochromic window; and
    a controller configured to increase and decrease transmissivity of the at least one electrochromic window, based on information from the one or more sensors.

9. The security system with smart windows of claim 8, further comprising:
    the controller configured to decrease transmissivity of the at least one electrochromic window in a nighttime mode; and
    the controller configured to direct a light controller to turn on at least one light in an area of a building, responsive to sensing an intrusion in the area of the building, based on the information from the one or more sensors.

10. The security system with smart windows of claim 8, wherein the at least one electrochromic window includes a self-break module for breaking the at least one electrochromic window responsive to sensing the security event.

11. The security system with smart windows of claim 8, wherein the system is in communication with a building monitoring system and wherein glass breakage is detected by interruption of electrical connectivity within the smart window.

12. The security system with smart windows of claim 8, further comprising:
    the controller configured to direct decreased transmissivity of one or more of the plurality of electrochromic windows of a designated room, responsive to sensing an intrusion in a differing room, based on information from the one or more sensors.

13. The security system with smart windows of claim 8, further comprising:
    the plurality of electrochromic windows networked together includes a distributed device network architecture in which a plurality of controllers and the plurality of electrochromic windows are distributed.

14. The security system with smart windows of claim 8, further comprising:
    the controller is configured to couple to a heating, ventilation and air conditioning system and configured to direct the heating, ventilation and air conditioning system to adjust a fan speed, responsive to sensing a fire.

15. A method, comprising:
    receiving sensor information from at least one sensor integrated into a frame of an electrochromic window, wherein transmissivity of the electrochromic window is increased and decreased in accordance with the at least one sensor; and
    detecting a security event, based on sensor information, wherein the transmissivity is increased and decreased responsive to the detecting.

16. The method of claim 15, wherein the electrochromic window includes a self-break module for breaking the electrochromic window responsive to the detecting.

17. The method of claim 15, further comprising:
    sending an alert to one or more predetermined contacts, responsive to the detecting and wherein the security event is glass breakage of the electrochromic window detected by sensing interruption of electrical connectivity within the electrochromic window.

18. The method of claim 15, further comprising:
    setting transmissivity of each of a plurality of electrochromic windows coupled to the electrochromic window to a predetermined level, responsive to the detecting.

19. The method of claim 15, further comprising:
    cycling transmissivity of the electrochromic window, responsive to the detecting.

20. The method of claim 15, further comprising:
coupling to a lighting controller;
coupling to a heating, ventilation and air conditioning controller; and
directing the lighting controller to adjust lights, the heating, ventilation and air conditioning controller to adjust a fan, and the electrochromic window to increase transmissivity, responsive to detecting the security event.

\* \* \* \* \*